United States Patent
Lee (10) Patent No.: US 10,349,317 B2
(45) Date of Patent: Jul. 9, 2019

(54) HANDOVER CONTROL IN MOBILE COMMUNICATION SYSTEM

(71) Applicant: Telefonaktiebolaget LM Ericsson (publ), Stockholm (SE)

(72) Inventor: Sangho Lee, Gwacheon-si (KR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/741,713

(22) PCT Filed: Jul. 6, 2015

(86) PCT No.: PCT/SE2015/050797
§ 371 (c)(1),
(2) Date: Jan. 3, 2018

(87) PCT Pub. No.: WO2017/007383
PCT Pub. Date: Jan. 12, 2017

(65) Prior Publication Data
US 2018/0206156 A1    Jul. 19, 2018

(51) Int. Cl.
*H04W 4/00* (2018.01)
*H04W 36/00* (2009.01)

(52) U.S. Cl.
CPC .... *H04W 36/0027* (2013.01); *H04W 36/0079* (2018.08)

(58) Field of Classification Search
None
See application file for complete search history.

(56) References Cited

U.S. PATENT DOCUMENTS

| 9,253,704 B1* | 2/2016 | Sarkar | H04W 36/30 |
| | | | 370/328 |
| 9,479,973 B2* | 10/2016 | Centonza | H04W 36/24 |
| | | | 370/328 |

(Continued)

FOREIGN PATENT DOCUMENTS

| WO | 2010/088805 A1 | 8/2010 |
| WO | 2011 120559 A1 | 10/2011 |

(Continued)

OTHER PUBLICATIONS

PCT Notification of Transmittal of the International Search Report and the Written Opihnion of the International Searching Authority, or the Declaration for International application No. PCT/SE2015/050797—dated Feb. 23, 2016.

(Continued)

Primary Examiner — Anh Vu H Ly
(74) Attorney, Agent, or Firm — Patent Portfolio Builders, PLLC (57) ABSTRACT

A target network node in a mobile communication system includes a receiver configured to receive a handover request message from a source network node, the handover request message including association information indicative of association among a plurality of bearers, a processor configured to check whether bearers associated with each other based on the association information are capable of being set up to determine acceptance or rejection of handover, and to generate a handover message indicative of the determined acceptance or rejection of handover, and a transmitter configured to transmit the handover message to the source network node.

18 Claims, 9 Drawing Sheets

(56) References Cited

U.S. PATENT DOCUMENTS

| | | | | |
|---|---|---|---|---|
| 2012/0294236 A1* | 11/2012 | Watfa | ............ | H04W 76/10 370/328 |
| 2014/0011510 A1* | 1/2014 | Balck | ............ | H04W 76/38 455/452.1 |
| 2014/0080484 A1* | 3/2014 | Centonza | ......... | H04W 36/24 455/436 |
| 2014/0370898 A1* | 12/2014 | Saily | ............ | H04W 36/32 455/436 |
| 2015/0215822 A1* | 7/2015 | Won | ............ | H04W 36/0011 370/331 |
| 2016/0219464 A1* | 7/2016 | Roeland | ......... | H04W 36/0022 370/328 |

FOREIGN PATENT DOCUMENTS

| WO | 2014 021761 A2 | 2/2014 |
|---|---|---|
| WO | 2014 158084 A1 | 10/2014 |
| WO | 2014 163550 A1 | 10/2014 |

OTHER PUBLICATIONS

Extended European Search Report issued in corresponding application No. 15897836.1, dated Oct. 29, 2018; 57 pages.

\* cited by examiner

| IE/Group Name | Presence | Description |
|---|---|---|
| Message Type | M | |
| Old eNodeB UE X2AP ID | M | |
| Cause | M | |
| Target Cell ID | M | |
| GUMMEI | M | |
| UE Context Information | M | |
| >MME UE S1AP ID | M | |
| >UE Security Capabilities | M | |
| >AS Security Information | M | |
| >UE Aggregate Maximum Bit Rate | M | |
| >Subscriber Profile ID for RAT/Frequency priority | O | |
| >E-RABs To Be Setup List | | |
| >>E-RABs To Be Setup Item | M | |
| >>>E-RAB ID | M | |
| >>>E-RAB Level QoS Parameters | M | |
| >>>DL Forwarding | O | |
| >>>UL GTP Tunnel Endpoint | M | |
| >>> Setup Indication | O | Range = {False, True} Indicates whether this E-RAB should be setup. If value == TRUE and this E-RAB is not granted, target eNB shall reject handover |
| >>>>Associated E-RAB ID | O | Range = {E-RAB ID} The associated E-RAB ID, if there's no associated E-RAB, it shall be set to same value as E-RAB ID. |
| >RRC Context | M | |
| >Handover Restriction List | O | |
| >Location Reporting Information | O | |
| >Management Based MDT Allowed | O | |
| UE History Information | M | |
| Trace Activation | O | |
| SRVCC Operation Possible | O | |
| CSG Membership Status | O | |

500 — Message Type row
510 — >E-RABs To Be Setup List
512 — >>>E-RAB ID
514 — >>>E-RAB Level QoS Parameters
516 — >>> Setup Indication
518 — >>>>Associated E-RAB ID

FIG. 6

```
-- ***************************************************
-- HANDOVER REQUEST
-- ***************************************************

HandoverRequest ::= SEQUENCE {
    protocolIEs             ProtocolIE-Container       {{HandoverRequest-IEs}},
    ...
}

E-RABs-ToBeSetup-Item ::= SEQUENCE {
    e-RAB-ID                E-RAB-ID,
    e-RAB-Level-QoS-Parameters      E-RAB-Level-QoS-Parameters,
    dL-Forwarding           DL-Forwarding                                        OPTIONAL,
    dL-GTPtunnelEndpoint    GTPtunnelEndpoint,
    iE-Extensions           ProtocolExtensionContainer { {E-RABs-ToBeSetup-ItemExtIEs} } OPTIONAL,
    ...
}

E-RABs-ToBeSetup-ItemExtIEs KCAP-PROTOCOL-EXTENSION ::= {
516 ── Setup-Indication    DL-Forwarding                                        OPTIONAL,
518 ── Associated-eRAB-ID  E-RAB-ID,                                            OPTIONAL,
    ...
}
```

HANDOVER CONTROL IN MOBILE COMMUNICATION SYSTEM

PRIORITY

This nonprovisional application is a U.S. National stage Filing under 35 U.S.C. § 371 of International Patent Application Serial No. PCT/SE2015/050797 filed Jul. 6, 2015, and entitled "Handover Control in Mobile Communication System."

TECHNICAL FIELD

The present disclosure generally relates to a mobile communication system, and more particularly to handover control in the mobile communication system.

BACKGROUND

When mobile user equipment (UE) is moving in a mobile communication system such as a long term evolution (LTE) system, it often travels through different cells. If the mobile UE is not using a communication service provided in the LTE system, the mobile UE will notify the network every now and then that it has moved to another cell. If the mobile UE is engaged in a specific communication service in the LTE system, the service needs to be maintained while the mobile equipment is moving to another cell and until the user stops the service. The process of replacing communication with one cellular radio station (e.g., evolved NodeB (eNB)) with another cellular radio station is referred to as handover.

Handover is one of the most important functions of the LTE system, which tries to keep the UE connected to the best eNB such that quality of service (QoS) of the ongoing session is met. In the LTE system, handover is usually based on the downlink and/or uplink channel measurements which are processed in the UE.

Generally, a source eNB initiates handover when the signal quality falls below a predetermined value by transmitting a handover request message to another eNB as a target eNB. Conventionally, when at least one evolved radio access bearer (E-RAB) is allocated in the target eNB, the target eNB sends a handover request acknowledgement message to the source eNB with partially allocated E-RAB information. In such a case, UE may experience service drop after handover. In the case of VoLTE service, which provides voice service by using two E-RABs (e.g., a media E-RAB and a signaling E-RAB), if the media E-RAB is not allocated at the target eNB and the signaling E-RAB is only handed over to the target eNB, UE may not be able to transmit and receive any voice packet to and from the target eNB.

Further, if at least one E-RAB is granted in the target eNB, resources of the granted E-RABs are allocated in the target eNB and the handover request acknowledgement message is sent to the source eNB with partially allocated E-RAB information. Thus, if the source eNB sends a handover cancellation message to abort handover to the target eNB based on the partially allocated E-RAB information, the target eNB releases the previously allocated E-RAB. In this case, the target eNB has to maintain the partially allocated E-RABs until the handover cancellation message is received from the source eNB. As a result, the resources at the target eNB may become unavailable temporarily so that another UE's connection setup request, an additional E-RAB setup request, or another incoming handover request may be restricted. In addition, unnecessary messages such as a handover cancellation message, etc. between the source eNB and the target eNB may increase signaling load on S1 or X2 interfaces.

Furthermore, if the target eNB sends a handover preparation failure message with cause to the source eNB, the handover will be stopped. In this case, UE may experience degraded quality of service because the UE remains in the source cell with poor radio environment until another neighbor cell, whose handover conditions are met, is found and handover is triggered again. Additionally, the handover preparation and cancellation may be repeated if the target eNB has fewer available resources during a busy period of use and a partial E-RAB setup occurs frequently.

SUMMARY

The present disclosure relates to handover control in a mobile communication system to provide an enhancement of a handover preparation scheme which is defined in 3GPP standard. According to the present disclosure, since a source evolved NodeB (eNB) transmits additional setup information on association among a plurality of E-RABs when transmitting a handover request message, a target eNB can decide whether to send a handover request acknowledgement message or a handover preparation failure message based on the additional setup information.

According to one embodiment of the present disclosure, there is provided a target network node in a mobile communication system, including: a receiver configured to receive a handover request message from a source network node, the handover request message including association information indicative of association among a plurality of bearers; a processor configured to check whether bearers associated with each other based on the association information are capable of being set up to determine acceptance or rejection of handover, and to generate a handover message indicative of the determined acceptance or rejection of handover; and a transmitter configured to transmit the handover message to the source network node.

According to another embodiment of the present disclosure, there is provided a source network node in a mobile communication system, including: a receiver configured to receive measurement reports from user equipment; a processor configured to perform handover decision based on the received measurement reports, the processor being further configured to determine bearers associated with each other for a specific service among a plurality of bearers to form association information indicative of association among the plurality of bearers when handover is decided, and to generate a handover request message including the association information; and a transmitter configured to transmit the handover request message to a target network node.

According to further another embodiment of the present disclosure, there is provided a method for controlling a handover in a target network node of a mobile communication system, including: receiving a handover request message from a source network node, the handover request message including association information indicative of association among a plurality of bearers; checking whether bearers associated with each other based on the association information are capable of being set up to determine acceptance or rejection of handover; generating a handover message indicative of the determined acceptance or rejection of handover; and transmitting the handover message to the source network node.

According to further another embodiment of the present disclosure, there is provided a method for controlling a handover in a source network node of a mobile communication system, including: receiving measurement reports from user equipment; performing handover decision based on the received measurement reports; determining bearers associated with each other for a specific service among a plurality of bearers to form association information indicative of association among the plurality of bearers when handover is decided; generating a handover request message including the association information; and transmitting the handover request message to a target network node.

DETAILED DESCRIPTION

Hereinafter, embodiments of the present disclosure will be described in detail with reference to the accompanying drawings. However, a detailed explanation of well-known functions or constructions will be omitted if there is a concern that such explanation may unnecessarily obscure the gist of the present disclosure.

Figure 1:
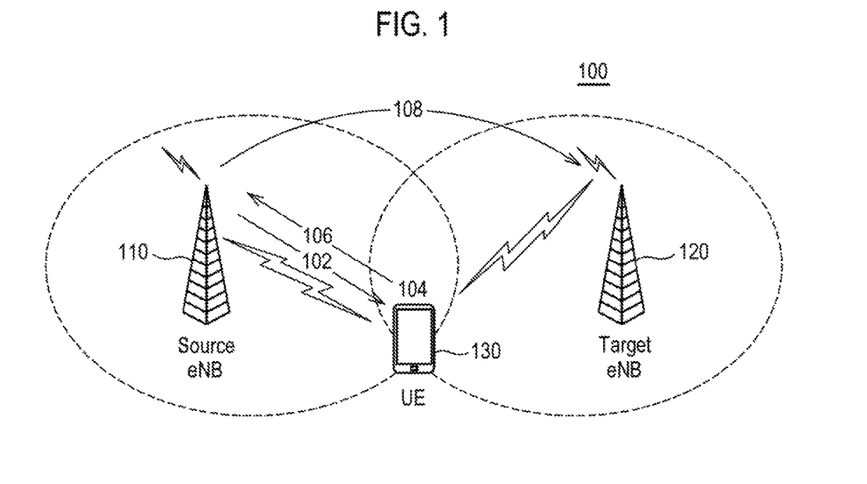
FIG. 1 is an exemplary diagram showing a handover process in an evolved universal mobile telecommunication system (E-UMTS) according to one embodiment of the present disclosure.

FIG. 1 is an exemplary diagram showing a handover process in an evolved universal mobile telecommunication system (E-UMTS) such as, for example, a long term evolution (LTE) system, according to one embodiment of the present disclosure. The E-UMTS includes an E-UMTS terrestrial radio access network (E-UTRAN) 100 configured with a plurality of evolved NodeBs (eNBs) 110 and 120, and user equipment (UE) 130. In FIG. 1, the eNB 110 represents a source eNB that currently provides a service to the UE 130, and the eNB 120 represents a target eNB that receives handover for the service of the UE 130 from the source eNB 110. The eNBs 110 and 120 provide end points of a user plane and a control plane to the UE 130 in the E-UTRAN 100. The eNBs 110 and 120 are generally fixed stations that communicate with the UE 130, and the eNBs 110 and 120 may be referred to as a base station, an access point, or the like. The eNBs 110 and 120 may be connected to each other via an X2 interface. The UE 130 is communication equipment, which may be referred to as a mobile station, a user terminal, a subscriber station, a wireless device, or the like.

In one embodiment, the handover process will be described while the eNBs 110 and 120 are connected to each other via the X2 interface. Referring to FIG. 1, the source eNB 110 configures measurements of the UE 130 according to area restriction information provided in the E-UTRAN 100, at 102, so that the UE 130 can transmit measurement reports on a radio quality of a different cell to the source eNB 110. Upon configuring the measurements, the UE 130 monitors a serving cell and one or more neighbor cells according to the configured measurements to create measurement reports, at 104. The UE 130 transmits the measurement reports to the source eNB 110 when predetermined reporting conditions are met, at 106. The source eNB 110 makes handover decisions based on the received measurement reports and requests the target eNB 120 to prepare for handover, at 108. At this time, context information for the UE 130 may be exchanged between the source eNB 110 and the target eNB 120 via the X2 interface.

Figure 2:
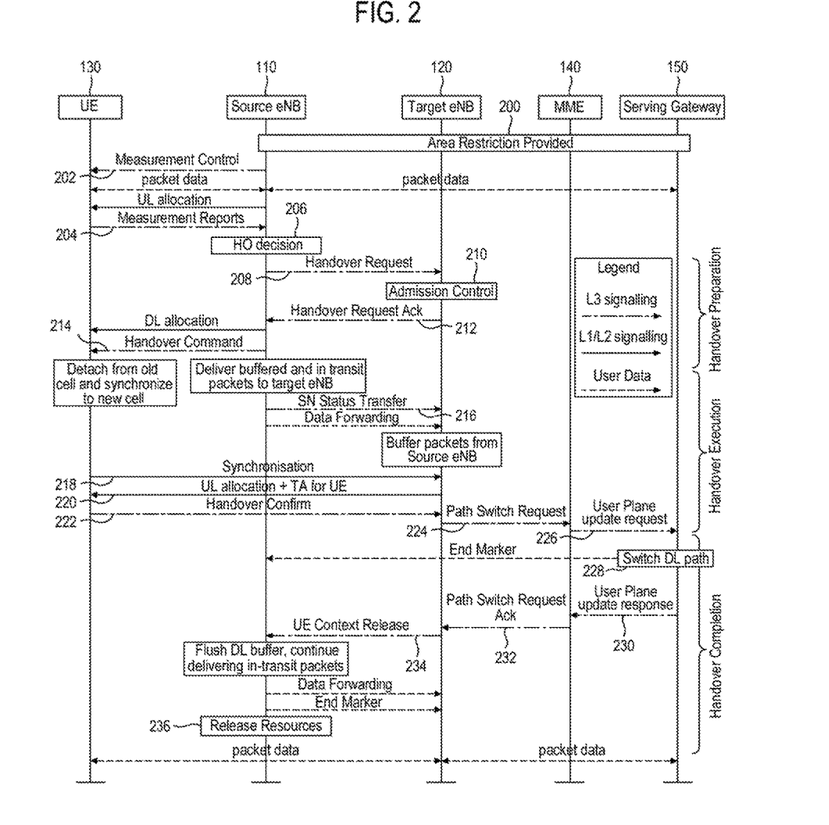
FIG. 2 is an exemplary flow diagram of a handover method for handing over UE from a source eNB to a target eNB via an X2 interface according to one embodiment of the present disclosure.

FIG. 2 is an exemplary flow diagram of a handover method for handing over the UE 130 from the source eNB 110 to the target eNB 120 via the X2 interface, according to one embodiment of the present disclosure. In addition to the eNBs 110 and 120 and the UE 130, the E-UTRAN 100 may include a mobility management entity (MME) 140 and a serving gateway 150. The MME 140 may be a control node that controls or provides various functions such as idle mode UE paging and tagging procedure, bearer activation and deactivation procedure, etc. The serving gateway 150 may be configured to route and forward user data packets and may be placed at the end of the E-UTRAN 100 and connected to an external network.

In the handover method illustrated in FIG. 2, area restriction information is provided, at 200. The source eNB 110 configures the UE measurement procedures according to the area restriction information and transmits a measurement control message to the UE 130 via L3 signaling, at 202. The measurement control message may include parameters and conditions to trigger measurement reports. Meanwhile, packet data may be exchanged between the source eNB 110 and the UE 130, or between the source eNB 110 and the serving gateway 150. Further, the source eNB 110 allocates an uplink (UL) for the UE 130 with L1/L2 signaling.

Hereafter, a handover preparation procedure will be described according to an embodiment of the present disclosure.

The UE 130 transmits measurement reports to the source eNB 110 in an uplink via L3 signaling when triggering criteria are satisfied based on the measurement control message, at 204. The source eNB 110 makes a handover decision based on the received measurement reports, at 206. If it is decided to hand over the UE 130, the source eNB 110 transmits a handover request message to the target eNB 120 via L3 signaling, at 208.

Figure 3:
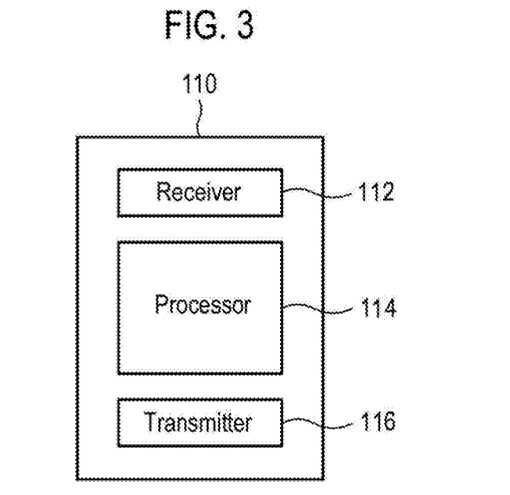
FIG. 3 is a block diagram showing configuration of the source eNB according to one embodiment of the present disclosure.
Figure 4:
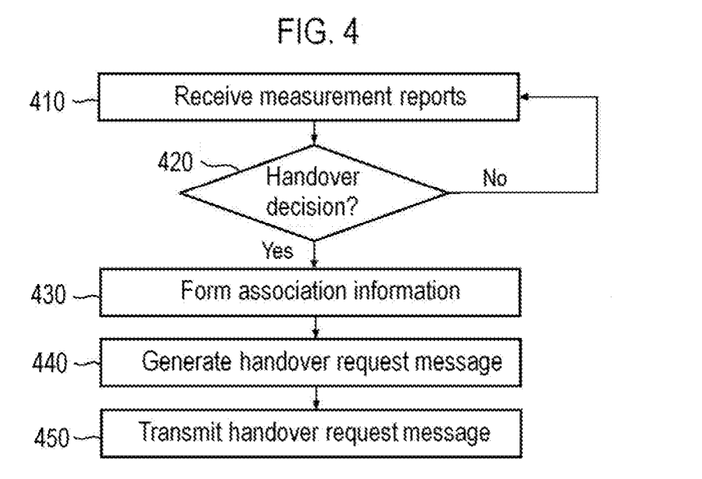
FIG. 4 shows a procedure for transmitting a handover request message in a source eNB according to one embodiment of the present disclosure.

FIG. 3 is a block diagram of the source eNB 110 that includes a receiver 112, a processor 124, and a transmitter 116, and FIG. 4 shows a for transmitting a handover request message in the source eNB 110. Referring to FIGS. 3 and 4, the receiver 112 receives the measurement reports from the UE 130, at 410. The processor 114 receives the measurement report from the receiver 112 to decide whether to perform the handover based thereon, at 420. When the handover is decided, the processor 114 determines evolved radio access bearers (E-RABs) associated with each other for a specific service among a plurality of E-RABs, which are allocated to the UE 130, to form association information indicative of association among the plurality of E-RABs, at 430. The processor 114 generates the handover request message including the association information, at 440. The transmitter 116 transmits the handover request message to the target eNB 120. The handover request message further includes information indicative of whether each of the plurality of E-RABs is mandatory setup.

Figure 5:
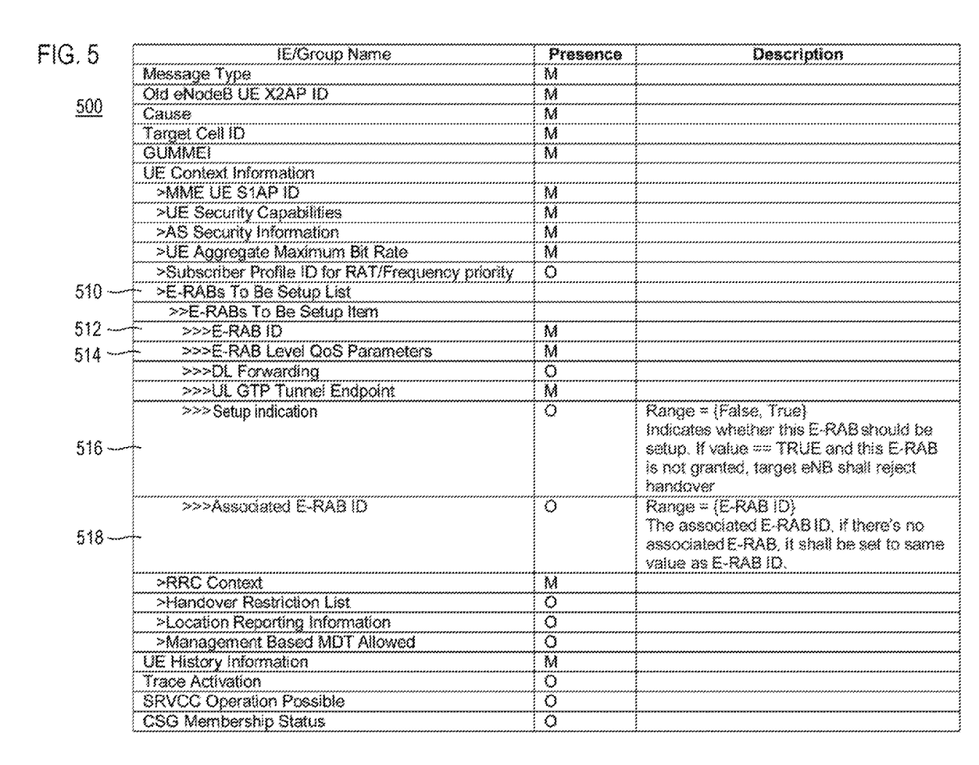
FIG. 5 is a table showing functional definition and contents of a handover request message according to one embodiment of the present disclosure.

FIG. 5 is a table partially showing functional definition and contents of a handover request message 500 according to one embodiment of the present disclosure. In the handover request message 500, the column "IE/Group Name" may indicate information elements or groups of information elements. Other columns may provide descriptions of these information elements or groups of information groups. For example, the column "Presence" indicates whether the presence of the corresponding information element or group of information elements is mandatory (M) or optional (O) in the handover request message 500. The designations in the "Presence" column may vary for different embodiments. The "Description" column may provide a brief description of the information element or group of information elements.

The handover request message 500 includes information that may be used for preparing the handover in the target eNB 120 such as setup information on a plurality of evolved radio access bearers (E-RABs) that are currently set up in the source eNB 110 for the UE 130. The setup information includes an E-RABs to be setup list 510 that may include E-RAB identifiers (IDs) 512 and E-RAB Level quality of service (QoS) parameters 514, and the like. In one embodiment, the E-RABs to be setup list 510 further includes information, which is denoted by setup indication 516 for each of the E-RABs in FIG. 5, indicative of whether setup for the E-RAB is mandatory in the target eNB 120 (i.e., whether the E-RAB must be set up in the target eNB 120), and association information 518, which is denoted by an associated E-RAB ID in FIG. 5, indicative of one of the E-RABs that is associated with and is to be set up together with the E-RAB. As shown in FIG. 5, the setup indication 516 in the handover request message 500 indicates that an E-RAB having a "True" value in the corresponding setup indication 516 must be set up in the target eNB 120 and, if the E-RAB having a "True" value in the setup indication 516 is not granted (i.e., cannot be set up), the target eNB 120 rejects the handover. The associated E-RAB ID 518 for a specified E-RAB is indicative of an E-RAB ID of an E-RAB that is to be set up together with the specified E-RAB for a specific service. In one embodiment, if an E-RAB does not have an associated E-RAB to be set up together, the associated E-RAB ID may be set to a same value as its own E-RAB ID.

Figure 6:
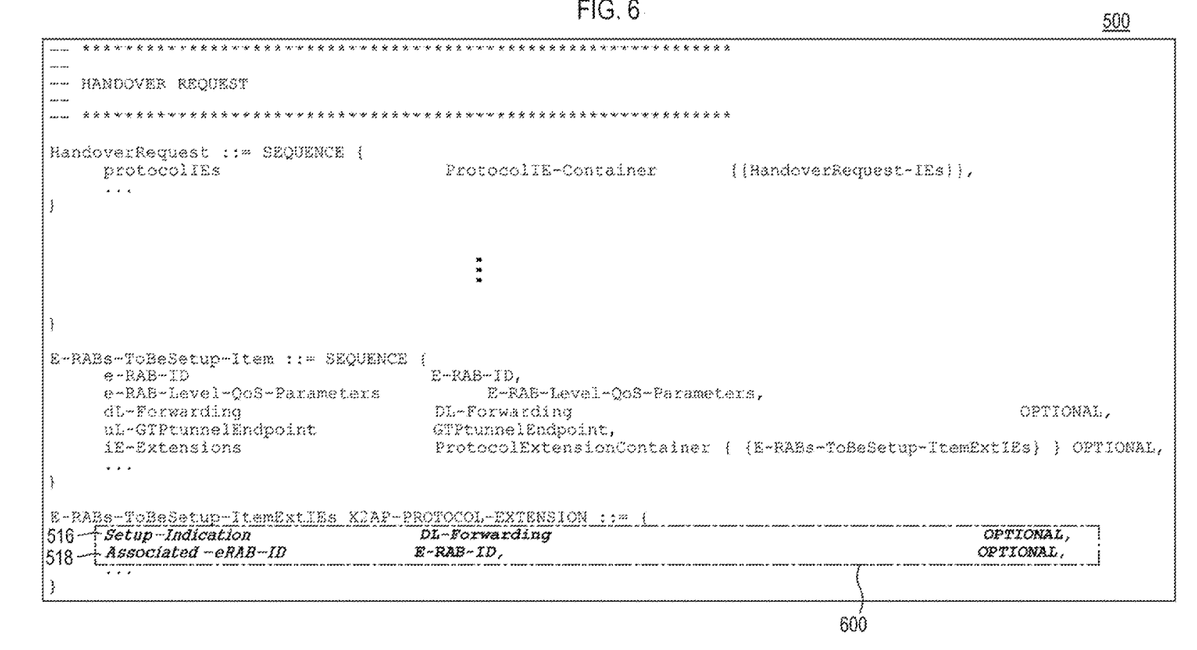
FIG. 6 shows an example of a portion of a handover request message into which items of a setup indication and an associated E-RAB ID are added according to one embodiment of the present disclosure.

FIG. 6 shows an exemplary portion of a handover request message in the third generation partnership project (3GPP) TS 36.423 according to one embodiment of the present disclosure. As shown in FIG. 6, new contents including the setup indication 516 and the associated E-RAB ID 518 are added to the handover request message 500. Detailed descriptions on functions of the setup indication 516 of the E-RABs and the associated E-RAB ID 518 will be described later with reference to FIGS. 8 and 10.

Referring back to FIG. 2, upon receiving the handover request message from the source eNB 110, the target eNB 120 performs admission control of the handover, at 210. The admission control may be performed to determine if the resources can be granted by the target eNB 120 based on information on the received E-RAB QoS parameters included in the handover request message to increase the likelihood of a successful handover. In case the resources can be granted, the target eNB 120 configures the required resources according to the received E-RAB QoS parameters and reserves a cell radio network temporary identifier (C-RNTI) and a random access channel (RACH) preamble for the UE 130.

The target eNB 120 prepares a handover with L1/L2 signaling and transmits a handover request acknowledgement message to the source eNB 110 via L3 signaling, at 212. In response to the handover request acknowledgement message, the source eNB 110 allocates a downlink (DL) to the UE 130 with L1/L2 signaling. The handover request acknowledgement message includes a transparent container to be sent to the UE 130 as a radio resource control (RRC) message to perform the handover. The transparent container may include a new C-RNTI, target eNB security algorithm identifiers for selected security algorithms, a dedicated RACH preamble, parameters such as radio network layer (RNL)/transport network layer (TNL) information for the forwarding tunnels, and the like.

Meanwhile, if there is a need for data forwarding from the source eNB 110 to the target eNB 120, the source eNB 110 can start forwarding the data to the target eNB 120 as soon as the source eNB 110 transmits a handover command in a downlink to the UE 130.

To perform the handover, the target eNB 120 generates an RRC message, i.e., an RRC connection reconfiguration message including mobility control information, and this message is sent to the UE 130 by the source eNB 110, at 214.

Hereafter, a handover execution procedure will be described according to an embodiment of the present disclosure.

When the handover execution procedure starts, the UE 130 detaches from an old cell and synchronizes to a new cell. In addition, the source eNB 110 delivers buffered and in-transit packets to the target eNB 120.

The source eNB 110 transmits a sequence number (SN) status transfer message to the target eNB 120 via L3 signaling to provide an uplink packet data convergence protocol (PDCP) SN receiver status and a downlink PDCP SN transmitter status of E-RABs, at 216. The uplink PDCP SN receiver status may include at least a PDCP SN of a first missing uplink service data unit (SDU). The downlink PDCP SN transmitter status indicates a next PDCP SN that the target eNB 120 may assign to new SDUs. The source eNB 110 may omit sending this SN status transfer message if none of the E-RABs of the UE 130 may be treated with PDCP status preservation.

In one embodiment, data forwarding of user plane downlink packets can be performed by using either a "seamless mode" that minimizes interruption time during movement of the UE 130 or a "lossless mode" that does not tolerate packets loss. The source eNB 110 may decide to operate in one of these two modes on an EPS bearer basis, based on the QoS received via X2 interface for this bearer.

After the UE 130 receives the RRC connection reconfiguration message including mobility control information, at 214, the UE 130 may perform synchronization with the target eNB 120 and access the target cell via RACH, at 218. If a dedicated RACH preamble was allocated for the UE 130, the access to the target cell via RACH may be a contention-free procedure. Otherwise, the access to the target cell via RACH may be a contention-based procedure.

In terms of security, the UE 130 derives target eNB specific keys and configures selected security algorithms to be used in the target cell.

The target eNB 120 responds to the synchronization of the UE 130 with UL allocation and timing advance via L1/L2 signaling, at 220. When the UE 130 has successfully accessed the target cell, the UE 130 transmits an RRC Connection Reconfiguration Complete message (C-RNTI) for handover confirmation, at 222. The target eNB 120 verifies the C-RNTI sent in the RRC Connection Reconfiguration Complete message and the target eNB 120 may begin transmitting data to the UE 130. In this process, packet data may be exchanged between the UE 130 and the target eNB 120.

Hereafter, a handover completion procedure will be described according to an embodiment of the present disclosure.

The target eNB 120 transmits a path switch request message to inform the MME 140 that the UE 130 has changed cell via L3 signaling, at 224. The MME 140 transmits an update user plane request message to the serving gateway 150 via L3 signaling, at 226. The serving gateway 150 switches a down link data path to the target eNB 120 and transmits one or more end marker packets on the old path to the source eNB 110 to indicate that no more packets will be transmitted on this path, at 228. Then, U-plane/TNL resources towards the source eNB 110 can be released.

The serving gateway 150 transmits an update user plane response message to the MME 140, at 230. The MME 140 transmits a path switch request acknowledgement message to the target eNB 120 to confirm the path switch message, at 232.

The target eNB 120 transmits a UE context release message to inform the source eNB 110 that the handover is successful, at 234. This UE context release message is transmitted to the source eNB 110 after the target eNB 120 receives the path switch acknowledge message from the MME 140. The source eNB 110 may flush DL buffer and continue delivering in-transit packets.

Upon receiving the UE context release message, the source eNB 110 may release radio and C-plane related resources associated with the UE context, at 236. At this time, packet data may be exchanged between the target eNB 120 and the UE 130, or between the target eNB 120 and the serving gateway 150.

Figure 7:
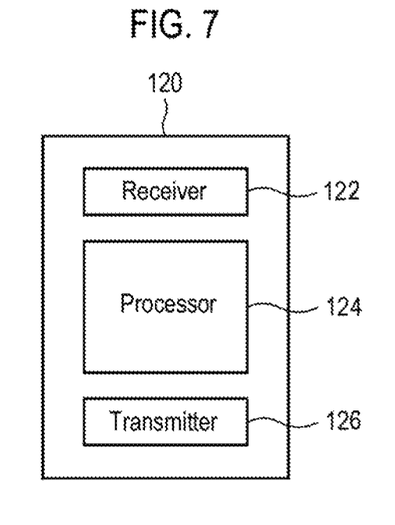
FIG. 7 is a block diagram showing configuration of the target eNB.
Figure 8:
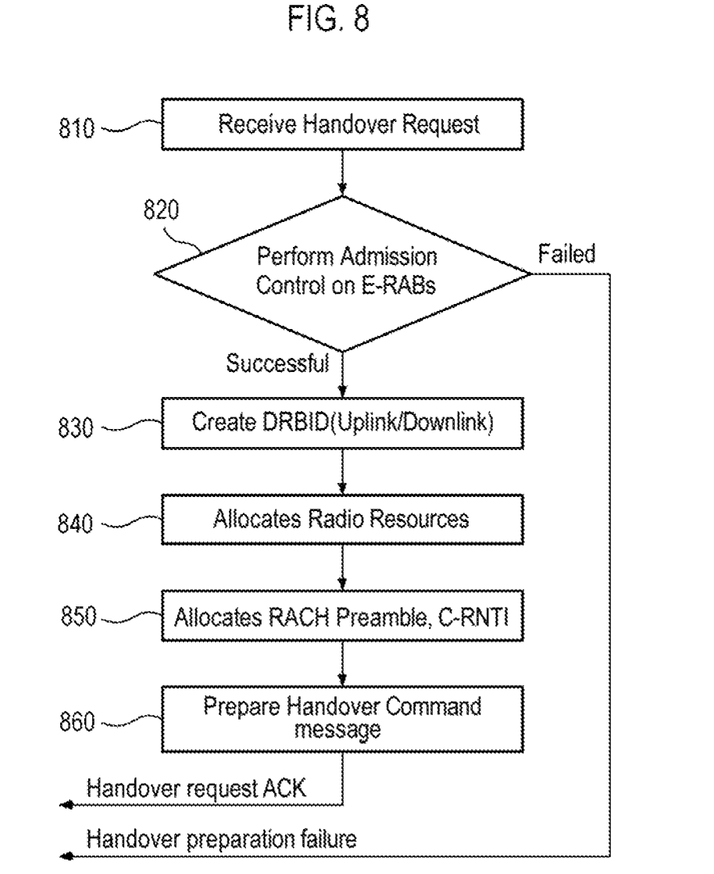
FIG. 8 shows a handover preparation procedure performed at a target eNB according to an embodiment of the present disclosure.

Hereinafter, the handover preparation procedure will be described in detail with reference to FIGS. 7 and 8 according to an embodiment of the present disclosure. FIG. 7 is a block diagram of the target eNB 120 that includes a receiver 122, a processor 124, and a transmitter 126. FIG. 8 shows the handover preparation procedure performed at 210 in FIG. 2 according to one embodiment of the present disclosure.

Referring to FIGS. 7 and 8, when the source eNB 110 makes a handover decision based on the measurement reports from the UE 130, a receiver 122 of the target eNB 120 receives a handover request message from the source eNB 110 via an X2 interface, at 810. The handover request message includes information about active E-RABs, i.e., E-RABs that are currently set up in the source eNB 110 to provide services for the UE 130. The information may further include security keys.

When the receiver 122 of the target eNB 120 receives the handover request message from the source eNB 110, at 820, the processor 124 in the target eNB 120 performs admission control on the active E-RABs included in the handover request message, at 820. In this process, the processor 124 checks whether resources are available in the target eNB 120 to accept this session. Further, the processor 124 checks a license for a specific service and configuration of each of the E-RABs to determine whether or not to determine each of the E-RABs is capable of being set up. A detailed admission control procedure will be described with reference to FIGS. 9 and 10 according to one embodiment of the present disclosure.

When the admission control is performed successfully, the processor 124 creates Dedicated Radio Bearer IDs (DRB IDs) for uplink and downlink communication with the UE 130, at 830. The processor 124 then allocates radio resources for the UE 130, at 840. The processor 124 allocates a RACH preamble and a new C-RNTI to the UE 130, at 850. The RACH preamble may be used to send a contention-free RACH by the UE 130.

The processor 124 prepares a handover command message (RRC Connection Reconfiguration Request) including mobility control information, at 860. The handover command message may include the RACH preamble that needs to be sent to the UE 130 and information about the allocated radio resources.

In response to the handover request message from the source eNB 110, the target eNB 120 transmits a handover request acknowledgment message through the transmitter 126. The handover request acknowledgement message may carry the handover command message (RRC Connection Reconfiguration Request) in a transparent container. On the other hand, if the handover preparation fails during the admission control performed at 820, the target eNB 120 may transmit a handover preparation failure message to the source eNB 110 through the transmitter 126 with one or more specified cause values indicative of one or more reasons for the handover preparation failure.

Figure 9:
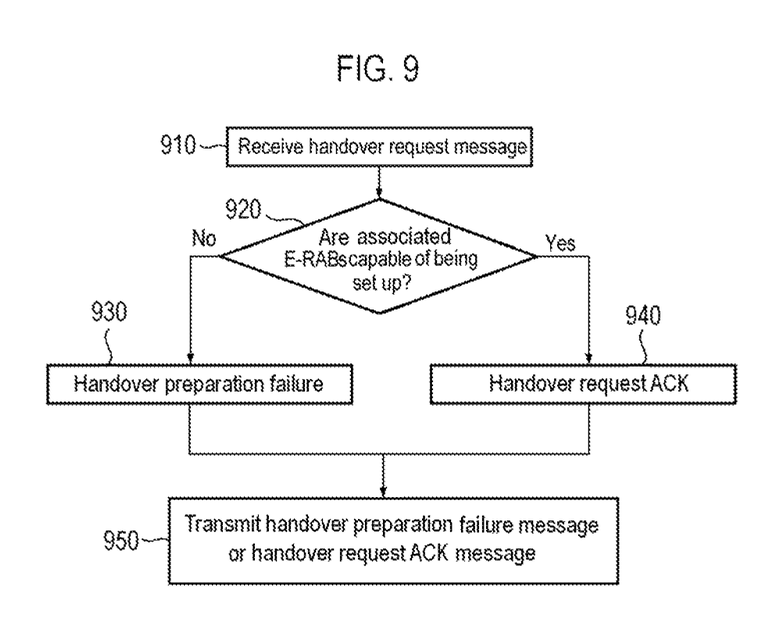
FIG. 9 shows a handover admission control procedure according to one embodiment of the present disclosure

FIG. 9 shows a handover admission control method at the target eNB 120 using the association information according to one embodiment of the present disclosure. Referring to FIGS. 7 and 9, the receiver 122 receives the handover request message including association information indicative of association among a plurality of E-RABs from the source eNB 110, at 910. The processor 124 checks whether E-RABs associated with each other based on the association information are capable of being set up to determine acceptance or rejection of handover, at 920. The processor 124 generates a handover message indicative of the rejection of handover, i.e., the handover preparation failure message, when at least one of the E-RABs associated with each other is not capable of being set up, at 930. Otherwise, the processor 124 generates the handover message indicative of the acceptance of handover, i.e., the handover request acknowledgement message, at 940. The transmitter 126 transmits the handover message to the source eNB 110, at 950.

Figure 10:
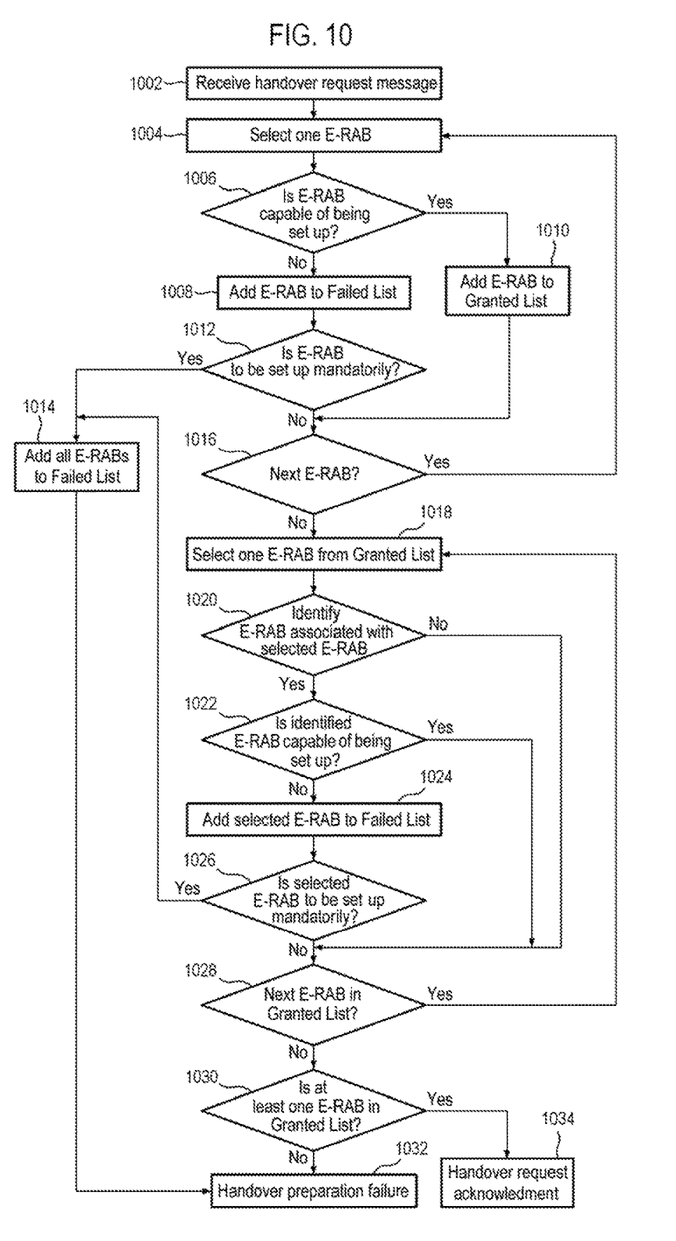
FIG. 10 shows a handover admission control procedure according to another embodiment of the present disclosure.

FIG. 10 shows a handover admission control method at the target eNB 120 according to another embodiment of the present disclosure. Referring to FIG. 10, after the receiver 122 in the target eNB 120 receives a handover request message from the source eNB 110, the processor 124 in the target eNB 120 receives the handover request message and classifies E-RABs based on the E-RAB level QoS parameters, and checks validity, licenses, and resource availability for the E-RAB s that are currently set up in the source eNB 110 for the service of the UE 130, at 1002. The E-RAB level QoS parameters may include QoS class identifier (QCI), allocation and retention priority (ARP), guaranteed bit rates (GBR), and the like. The handover request message may include setup information for a plurality of E-RABs and the setup information may include setup indication for each of the E-RAB s indicative of whether setup for the E-RAB is mandatory and association information, which is denoted by an associated E-RAB identifier (ID), indicative of one of the plurality of E-RABs that is associated with the E-RAB and to be set up together with the E-RAB.

The processor 124 may select an E-RAB among the E-RABs in the setup information according to predetermined priorities, at 1004, and determine whether the selected E-RAB is capable of being set up in the target eNB 120, i.e., whether the E-RAB can be set up successfully, at 1006. When it is determined that an E-RAB cannot be set up successfully (i.e., failed to be set up) in the target eNB 120, the processor 124 forms a failed list to add the E-RAB thereto, at 1008. That is, the failed list includes E-RABs that are not to be capable of being set up. On the other hand, if it is determined that the E-RAB can be set up successfully, the processor 124 forms a granted list to add the E-RAB thereto, at 1010. That is, the granted list includes E-RABs that are to be capable of being set up.

At 1012, the processor 124 checks whether setup of the selected E-RAB included in the failed list is mandatory (i.e., must be set up) in the target eNB 120 based on the setup information. If setup of the E-RAB, which has been added to the failed list, is mandatory as when its setup indication is set to "True," the processor 124 may add all of the E-RABs to the failed list, at 1014, and proceed to generate a handover preparation failure message at 1032.

On the other hand, if setup of the E-RAB, which has been added to the failed list, is not mandatory, the processor 124 checks whether one or more E-RABs exist, at 1016, and if so, the method proceeds to select another E-RAB from the remaining E-RABs at 1004 for processing the E-RAB in the manner described above. If it is determined that all of the E-RABs have been processed in 1016, the processor 124 may proceed to select an E-RAB among the E-RABs included in the granted list, at 1018, and identify an E-RAB associated with the selected E-RAB based on the associated E-RAB ID in the setup information, at 1020.

If it is determined that the E-RAB associated with the selected E-RAB is identified, the processor 124 checks whether the identified E-RAB is capable to being set up, at 1022. If it is determined that the E-RAB associated with the selected E-RAB is not identified, i.e., the E-RAB associated with the selected E-RAB does not exist, the method proceeds to check remaining E-RAB in the granted list, at 1028.

If it is determined that the identified E-RAB cannot be set up, the processor 124 adds the selected E-RAB to the failed list, at 1024. On the other hand, if the identified E-RAB can be set up, the processor 124 may proceed to 1028.

The processor 124 then checks whether setup of the E-RAB, which has been added to the failed list at 1024, is mandatory based on the setup indication in the setup information, at 1026. If the E-RAB added to the failed list at 1024 must be set up (i.e., mandatory setup), the method proceeds to 1014, where all of the E-RABs are added into the failed list. On the other hand, if setup of the E-RAB, which has been added to the failed list at 1024, is not mandatory (i.e., is not required to be set up), the processor 124 checks whether next E-RAB is in the granted list, at 1028. If it is determined that next E-RAB is not in the granted list, at 1028, the method proceeds to 1030. Otherwise, the method proceeds back to 1018.

At 1030, the processor 124 checks whether at least one E-RAB is in the granted list, at 1030. If it is determined that no E-RAB is in the granted list, at 1030, the processor 124 prepares the handover failure message, at 1032. On the other hand, if it is determined that at least one E-RAB is in the granted list, the processor 124 prepares a handover request acknowledgement message, at 1034.

The functions of the additionally added items, i.e., the setup indication and the associated E-RAB ID into the handover request message will be described according to one embodiment of the present disclosure. Assuming that a VoLTE service and a gaming service are provided to the UE 130 in the source eNB 110, the VoLTE service may need two E-RABs (e.g., signaling E-RAB and media E-RAB) and the gaming service may need one E-RAB (e.g., real time gaming E-RAB) in addition to a default E-RAB having a resource type of a non-guaranteed bit rate (e.g., buffered streaming E-RAB). That is, four E-RABs are needed to provide the VoLTE service and the gaming service to the UE 130. When handover is initiated, the E-RAB IDs, the setup indication, and an associated E-RAB ID, which are included in a handover request message, may be set as shown in the following table.

TABLE 1

| Service | E-RAB | E-RAB ID | Setup indication | Associated E-RAB ID |
| --- | --- | --- | --- | --- |
| VoLTE | Media | 1 | True | 2 |
|  | Signaling | 2 | False | 1 |
| Gaming | Real time Gaming | 3 | False | 3 |
| Default | Buffered Streaming | 4 | True | 4 |

Case 1: If all of the E-RABs can be set up in the target eNB 120, i.e., the media E-RAB, the signaling E-RAB, the Gaming E-RAB, and the default E-RAB can be set up in the target eNB 120, the handover request acknowledgement message is transmitted from the target eNB 120 to the source eNB 110.

Case 2: If all of the E-RABs cannot be set up in the target eNB 120, i.e., the media E-RAB, the signaling E-RAB, the Gaming E-RAB, and the default bearer cannot be set up in the target eNB 120, the handover preparation failure message is transmitted from the target eNB 120 to the source eNB 110.

Case 3: If the media E-RAB cannot be set up and other E-RABs can be set up in the target eNB 120, since setup of the media E-RAB is mandatory, all of the E-RABs are added to the failed list in the target eNB 120 even if the E-RABs can be partially allocated. Thus, a handover preparation failure message is transmitted from the target eNB 120 to the source eNB 110.

Case 4: If the signaling E-RAB cannot be set up and other E-RABs can be set up in the target eNB 120, since the media E-RAB is associated with the signaling E-RAB, the processor 124 of the target eNB 120 may generate a handover message indicative of the rejection of handover, i.e., handover preparation failure message according to one embodiment of the present disclosure. Further, the processor 124 of the target eNB 120 adds the media E-RAB to the failed list according to another embodiment of the present disclosure. In such a case, setup of the media E-RAB is mandatory and all of the E-RABs are added to the failed list in the target eNB 120, so that a handover preparation failure message is transmitted from the target eNB 120 to the source eNB 110 even if the E-RABs can be partially allocated.

Case 5: If the real time gaming E-RAB cannot be set up and other E-RABs can be set up in the target eNB 120, since the real time gaming E-RAB is not mandatory setup and does not have an associated E-RAB, the handover request acknowledgement message is transmitted from the target eNB 120 to the source eNB 110 even if the E-RABs are partially allocated. In this case, the gaming service can be provided to the UE 130 through other E-RABs, such as the media E-RAB, the default E-RAB, or the like, which can be allocated in the target eNB 120.

Although intra X2-based handover procedures are described above, the handover may not be limited thereto. There may be several types of handover and similar methods could be applied to each different types of handover, such as an intra S1-based handover, an intra-radio access technology (RAT) handover, etc.

As described above according to one embodiment of the present disclosure, since the source eNB 110 transmits the additional setup information including the setup indication and the associated E-RAB ID for each of the E-RABs when transmitting the handover request message, the target eNB 120 can decide whether to send a handover request acknowledgement message or a handover preparation failure message based on the additional setup information. That is, when incoming handover is rejected at the target side, the target eNB 120 decides to reject all of the E-RABs by adding the E-RAB s to the failed list based on the addition setup information including the setup indications and the associated E-RAB IDs, even if the E-RABs can be partially allocated. Thus, the source eNB 110 does not need to send the handover cancellation message to the target eNB 120, which may cause signaling load between the source eNB 110 and the target eNB 120 to be decreased.

Further, in case of partial E-RAB allocation at the target eNB 120, service drop may not be expected because a service provided with multiple E-RABs cannot be partially allocated at the target eNB 120.

At the target eNB 120, since E-RAB resources are allocated only when incoming handover can proceed, the allocated resources at the target eNB 120 do not need to be released due to the handover cancellation message from the source eNB 110 during the handover preparation procedure.

In some embodiments, the target eNB 120 may include one or more failure reasons of the E-RABs in a handover preparation failure message and transmit the message to the source eNB 110. If a cause for failure is permanent, such as a lack of license or a wrong configuration for the E-RABs, the source eNB 110 can temporarily register the corresponding target eNB 120 into a handover restricted area for a predefined duration. In such a case, related observabilities regarding one or more failure reasons may be provided to an operator as well as partial success case.

Although the present disclosure has be described with respect to certain embodiments, it will be understood that various modifications and changes may be made without departing from the spirit and scope of the present disclosure, as those skilled in the art will appreciate. Further, it is considered that such modifications and changes fall within the scope of the claims appended hereto.

What is claimed is:

1. A target network node in a mobile communication system, the target network node comprising:
    a receiver configured to receive a handover request message from a source network node, wherein the handover request message comprises:
        association information indicative of association among a plurality of bearers, wherein the association information is an associated bearer identifier (ID) indicative of one of the plurality of bearers that is associated with a bearer among the plurality of bearers and to be set up together with the bearer, and
        a bearer ID indicative of each bearer of the plurality of bearers,
        wherein the associated bearer ID is set to a same value as the bearer ID for each bearer, of the plurality of bearers, that does not have an associated bearer;
    a processor configured to check whether bearers, among the plurality of bearers, associated with each other based on the association information are capable of being set up to determine acceptance or rejection of handover, and to generate a handover message indicative of the determined acceptance or rejection of handover; and
    a transmitter configured to transmit the handover message to the source network node.

2. The target network node of claim 1, wherein the processor is configured to decide whether the plurality of bearers are capable of being set up based on at least one of available radio resources, a license for a specific service or configuration of each of the plurality of bearers.

3. The target network node of claim 1, wherein the processor is configured to generate the handover message indicative of the determined rejection of handover when at least one of the bearers associated with each other is not capable of being set up.

4. The target network node of claim 1, wherein the handover request message further includes information indicative of whether setup of each of the bearers is mandatory setup.

5. The target network node of claim 4, wherein the processor is configured to generate the handover message indicative of the determined rejection of handover when setup, of at least one of bearers that are not capable of being set up, is mandatory setup.

6. The target network node of claim 5, wherein the processor is configured to form a granted list including bearers to be capable of being set up, and a failed list including bearers not to be capable of being set up.

7. The target network node of claim 6, wherein the processor is further configured to:
    sequentially select a bearer among the bearers included in the granted list;
    identify a bearer associated with the selected bearer based on the association information;
    check whether the identified bearer is capable of being set up;
    add the selected bearer to the failed list when the identified bearer is not capable of being set up;
    check whether setup, of the selected bearer added to the failed list, is mandatory setup; and
    add all of the plurality of bearers to the failed list when the setup, of the selected bearer, is mandatory setup to thereby determine the rejection of handover.

8. A source network node in a mobile communication system, the source network node comprising:
    a receiver configured to receive measurement reports from a user equipment;
    a processor configured to perform handover decision based on the received measurement reports, the processor being further configured to determine bearers associated with each other for a specific service among a plurality of bearers to form association information indicative of association among the plurality of bearers when handover is decided, and to generate a handover request message, wherein the handover request message comprises:

the association information, wherein the association information is an associated bearer identifier (ID) indicative of one of the plurality of bearers that is associated with a bearer among the plurality of bearers and to be set up together with the bearer for the specific service, and a bearer ID indicative of each bearer of the plurality of bearers, wherein the associated bearer ID is set to a same value as the bearer ID for each bearer, of the plurality of bearers, that does not have an associated bearer; and a transmitter configured to transmit the handover request message to a target network node.

9. The source network node of claim 8, wherein the handover request message further includes information indicative of whether setup of each of the plurality of bearers is mandatory setup.

10. A method for controlling a handover in a target network node of a mobile communication system, the method comprising:

receiving a handover request message from a source network node, wherein the handover request message comprises:

association information indicative of association among a plurality of bearers, wherein the association information is an associated bearer identifier (ID) indicative of one of the plurality of bearers that is associated with a bearer among the plurality of bearers and to be set up together with the bearer, and a bearer ID indicative of each bearer of the plurality of bearers, wherein the associated bearer ID is set to a same value as the bearer ID for each bearer, of the plurality of bearers, that does not have an associated bearer;

checking whether bearers, among the plurality of barriers, associated with each other based on the association information are capable of being set up to determine acceptance or rejection of handover;

generating a handover message indicative of the determined acceptance or rejection of handover; and transmitting the handover message to the source network node.

11. The method of claim 10, wherein setup of each of the plurality of bearers is decided based on at least one of available radio resources, a license for a specific service, or configuration of each of the plurality of bearers.

12. The method of claim 10, wherein the handover message indicative of the determined rejection of handover is generated when at least one of the bearers associated with each other is not capable of being set up.

13. The method of claim 10, wherein the handover request message further includes information indicative of whether setup of each of the bearers is mandatory setup.

14. The method of claim 13, wherein the handover message indicative of the determined rejection of handover is generated when setup, of at least one of bearers that are not capable of being set up, is mandatory setup.

15. The method of claim 14, further comprising forming a granted list including bearers to be capable of being set up, and a failed list including bearers not to be capable of being set up.

16. The method of claim 15, wherein the checking whether bearers associated with each other based on the association information are capable of being set up includes:

sequentially selecting a bearer among the bearers included in the granted list;

identifying a bearer associated with the selected bearer based on the association information;

checking whether the identified bearer is capable of being set up;

adding the selected bearer to the failed list when the identified bearer is not capable of being set up;

checking whether setup, of the selected bearer added to the failed list, is mandatory setup; and adding all of the plurality of bearers to the failed list when the setup, of the selected bearer, is mandatory setup to thereby determine the rejection of handover.

17. A method for controlling a handover in a source network node of a mobile communication system, the method comprising:

receiving measurement reports from a user equipment;

performing handover decision based on the received measurement reports;

determining bearers associated with each other for a specific service among a plurality of bearers to form association information indicative of association among the plurality of bearers when handover is decided;

generating a handover request message, wherein the handover request message comprises:

the association information, wherein the association information is an associated bearer identifier (ID) indicative of one of the plurality of bearers that is associated with a bearer among the plurality of bearers and to be set up together with the bearer for the specific service, and a bearer ID indicative of each bearer of the plurality of bearers, wherein the associated bearer ID is set to a same value as the bearer ID for each bearer, of the plurality of bearers, that does not have an associated bearer; and transmitting the handover request message to a target network node.

18. The method of claim 17, wherein the handover request message further includes information indicative of whether setup of each of the plurality of bearers is mandatory setup.

* * * * *